United States Patent
Blanchard et al.

(10) Patent No.: US 8,336,317 B2
(45) Date of Patent: Dec. 25, 2012

(54) VENTILATION FOR A TURBINE WHEEL IN A TURBINE ENGINE

(75) Inventors: Stéphane Pierre Guillaume Blanchard, Chartrettes (FR); Patrick Claude Pasquis, Moisenay (FR); Wilfried Lionel Schweblen, Chateaubleau (FR); Jean-Claude Christian Taillant, Vaux le Penil (FR)

(73) Assignee: SNECMA, Paris (FR)

( * ) Notice: Subject to any disclaimer, the term of this patent is extended or adjusted under 35 U.S.C. 154(b) by 176 days.

(21) Appl. No.: 12/889,791

(22) Filed: Sep. 24, 2010

(65) Prior Publication Data

US 2011/0072832 A1 Mar. 31, 2011

(30) Foreign Application Priority Data

Sep. 25, 2009 (FR) ..................... 09 04598

(51) Int. Cl.
*F02C 7/12* (2006.01)
(52) U.S. Cl. ......................................................... 60/806
(58) Field of Classification Search ................... 60/726, 60/751, 782, 785, 806; 415/108, 115–117, 415/173.5, 174.5; 416/95, 96 R
See application file for complete search history.

(56) References Cited

U.S. PATENT DOCUMENTS

| | | | |
|---|---|---|---|
| 4,425,079 A * | 1/1984 | Speak et al. .................. 415/139 |
| 5,555,721 A | 9/1996 | Bourneuf et al. |
| 6,540,477 B2 * | 4/2003 | Glynn et al. ................... 415/115 |
| 6,787,947 B2 * | 9/2004 | Coulon et al. .................... 310/52 |
| 7,857,581 B2 * | 12/2010 | Mons et al. ................ 415/173.5 |
| 8,087,249 B2 * | 1/2012 | Ottaviano et al. ............... 60/726 |
| 2006/0213202 A1 | 9/2006 | Fukutani |
| 2008/0141678 A1 * | 6/2008 | Brunet et al. .................... 60/806 |
| 2008/0141679 A1 * | 6/2008 | Behaghel et al. ............... 60/806 |
| 2008/0141680 A1 * | 6/2008 | Brunet et al. .................... 60/806 |
| 2009/0097971 A1 * | 4/2009 | Dakowski et al. .......... 415/174.5 |
| 2012/0085104 A1 * | 4/2012 | Garin et al. ..................... 60/806 |

FOREIGN PATENT DOCUMENTS

| | | |
|---|---|---|
| EP | 1 785 651 A1 | 5/2007 |
| EP | 1 881 180 A2 | 1/2008 |
| FR | 2 772 835 | 6/1999 |
| FR | 2 907 499 | 4/2008 |

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

A turbine engine, including a final centrifugal compressor stage associated with a diffuser for supplying air to a combustion chamber, and a ventilation element for ventilating a high-pressure turbine wheel, is disclosed. The ventilation element includes an injection element for injecting air onto the wheel and a take-up element for taking up a flow for cooling the impeller of the compressor, where the take-up element has a labyrinth seal mounted at the outlet of the injection element, and the air outlet orifices are installed between the injection element and the labyrinth seal and leading upstream of the turbine wheel.

9 Claims, 3 Drawing Sheets

VENTILATION FOR A TURBINE WHEEL IN A TURBINE ENGINE

This invention relates to a turbine engine, such as a turbojet or a turboprop engine of an airplane, including a compressor and an annular diffuser supplying air to an annular combustion chamber and turbine wheel ventilation means.

BACKGROUND OF THE INVENTION

As is known, the combustion chamber of the turbine engine is located in an annular space defined by an internal housing and an external housing, in which the internal housing supports the diffuser of which the inlet is aligned with the outlet of the compressor, which is radial when the last stage of the compressor is centrifugal.

The air leaving the diffuser is intended, primarily, to enter the combustion chamber and to be mixed with fuel and then burned, and, secondarily, to bypass the combustion chamber in order to supply primary orifices for dilution of the chamber and means for injecting ventilation air in particular of the wheel of the first stage of the high-pressure turbine, located downstream of the combustion chamber.

A small portion of the air flow leaving the compressor is taken to cool the impeller of the last compressor stage. This air then flows downstream in an annular space defined by the internal housing of the chamber and a substantially cylindrical rotor or rotating wall extending radially inside the internal housing and injection means and connecting the impeller of the compressor to the turbine wheel, then passes into the high-pressure turbine blades in order to cool them.

The injection means include an annular duct of which the air outlet leads axially downstream for the injection of air onto the turbine wheel, through orifices of a flange mounted upstream of said wheel. These injection means also include substantially radial bypass ducts for the passage of a major portion of the air flow for cooling the impeller of the compressor, which has flowed downstream into the aforementioned annular space to the injection means.

A labyrinth-type seal is mounted between the injection means and the upstream flange of the turbine wheel, which seal comprises blocks of corrodible material attached to the outlet of the injection means and cooperating with annular lips borne by the upstream flange. A small portion of the air flow for cooling the impeller of the compressor is intended to axially pass through this seal.

The remaining portion of the air flow for cooling the impeller passes through the bypass ducts of the injection means and is intended to ventilate the upstream flange of the high-pressure turbine wheel, then injected into the channel of the turbine.

This technology enables the upstream flange of the turbine wheel to be well ventilated, but the air flow used for this ventilation is then directly injected into the channel of the turbine and does not therefore participate in the thermodynamic cycle of the engine, which is detrimental in terms of the performance of the turbine engine.

SUMMARY OF THE INVENTION

The invention is intended in particular to provide a simple, effective and economical solution to this problem owing to means enabling the air flow for cooling the impeller of the compressor to be used more effectively and the ventilation and/or cooling of the high-pressure turbine to be optimized.

It thus proposes a turbine engine, such as an airplane turbojet or a turboprop engine, comprising a final centrifugal compressor stage associated with an annular diffuser for supplying air to an annular combustion chamber, and ventilation means for ventilating a high-pressure turbine wheel, including injection means for injecting air onto the turbine wheel through orifices of an upstream flange, said injection means being supplied by the diffuser, and take-up means for taking up a flow for cooling the impeller of the final stage of the compressor, said take-up means comprising a rotating wall extending between the impeller of the final stage of the compressor and the upstream flange of the turbine wheel and a labyrinth seal mounted between the injection means and the upstream flange, at the upstream end of the rotating wall, wherein the take-up means also include air outlet orifices installed between the injection means and the labyrinth seal and leading to the upstream flange of the turbine wheel.

According to the invention, a large portion of the air for cooling the impeller of the compressor, which has flowed downstream to the injection means, is injected onto the upstream flange so as to mix with the air leaving the injection means; this air mixture is intended to be injected to the high-pressure turbine wheel through the orifices of the upstream flange so as to ensure ventilation and/or cooling of said wheel, which is thus better ventilated than in the prior art. The remaining portion of the air flow for cooling the impeller passes through the labyrinth seal and also mixes with the air leaving the injection means. The air flow for cooling the impeller of the compressor can therefore be entirely mixed with the air flow leaving the injection means. The invention therefore makes it possible to more effectively use the air flow taken at the outlet of the compressor, of which the integrality can participate in the ventilation and/or the cooling of the turbine so as to increase the performance of the turbine engine.

This enables the amount of air flow injected into the channel of the turbine to be reduced. In a particular embodiment, a gain of 0.15% in the specific consumption of the turbine engine can be observed with this invention.

According to another feature of the invention, the air outlet orifices formed at the downstream end of at least one longitudinal duct of which the upstream end leads into an annular space defined by the rotating wall for the passage of the flow for cooling the impeller of the final stage of the compressor. This longitudinal duct is advantageously annular.

According to an embodiment of the invention, the take-up means include a substantially cylindrical annular sheet surrounded by injection means, and defining the aforementioned longitudinal duct(s) with these injection means. This sheet is formed in a single piece and with a low profile and weight.

The sheet can comprise, at its upstream end, a radially external annular edge that is supported, by its external periphery, on the injection means or that is at a radial distance from same, and that comprises axial air inlet openings in the aforementioned longitudinal ducts.

The sheet includes, at its downstream end, an annular edge formed with the air outlet orifices. These orifices can be substantially axial or inclined from upstream to downstream so as to guide the air leaving in the direction of rotation of the turbine wheel.

Alternatively, the air outlet orifices lead radially inwardly, and these orifices are substantially radial or inclined from the outside to the inside with respect to a radial axis in order to guide the air leaving in the direction of rotation of the turbine wheel.

The fact of causing the air leaving the duct to rotate enables the total relative temperature of this air in the mobile—connected to the turbine wheel to be reduced, i.e. the total relative temperature seen by the turbine wheel in operation. The lower the total relative temperature of the air is, the lower the air flow necessary for cooling the wheel will be for a given rotation speed. The total relative temperature of the air is determined in particular on the basis of the total temperature of the air, the entrainment coefficient of the air, the rotation speed of the rotor, and the specific heat capacity of the air. The more the air outlet orifices are inclined in the direction of rotation of the rotor, the higher the entrainment coefficient of the air is (between 0.5 and 1) and the lower the total relative temperature of the air is.

The sheet is preferably attached by brazing or welding by its downstream end to the downstream end of the injection means. The sheet can also be attached by brazing or welding of the internal cylindrical surface on the corrodible material block support means of the seal. The sheet according to the invention thus has the corrodible material blocks of the seal.

The injection means can include substantially radial bypass ducts for the passage of air for cooling the impeller of the compressor, as in the prior art. The air flow for cooling the impeller of the compressor that has flowed into the aforementioned annular space is divided into a main flow passing into the aforementioned longitudinal duct(s) and through the labyrinth seal, and into a second flow passing through the bypass ducts of the injection means.

BRIEF DESCRIPTION OF THE DRAWINGS

The invention can be better understood, and other details, features and advantages of the invention will become clear on reading the following non-limiting example in reference to the appended drawings, in which.

MORE DETAILED DESCRIPTION

Figure 1:
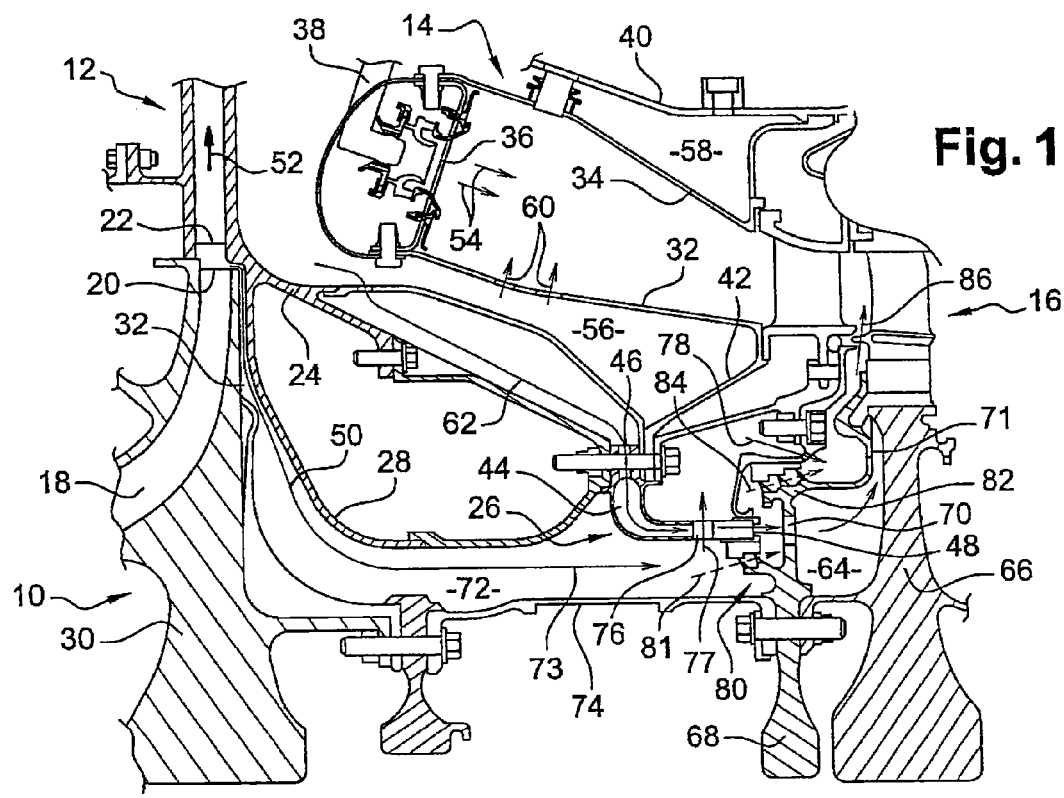
FIG. 1 is a partial diagrammatic half view in an axial cross-section of a turbine engine according to the prior art.

FIG. 1 shows a portion of a turbine engine, such as an airplane turbojet or turboprop engine, comprising, from upstream to downstream, in the direction of flow of the gases inside the turbine engine, a centrifugal compressor 10, an annular diffuser 12, an annular combustion chamber 14, and a high-pressure turbine 16.

The inlet 18 of the centrifugal compressor 10 is directed downstream, substantially parallel to the axis of the turbine engine, and its outlet 20 is radially directed outwardly, substantially perpendicular to the axis of the turbine engine.

The diffuser 12 is of the 90° elbow type, and includes an inlet 22 aligned with the outlet 20 of the compressor, and an outlet (not visible) that is directed downstream and that leads radially to the outside of the combustion chamber 14.

The diffuser 12 includes, at its internal periphery, a first downstream frusto-conical wall 24 that comprises, at its downstream end, an annular attachment flange on means 26 for injecting a wheel 66 of the turbine 16 with ventilation air.

The diffuser 12 also comprises, at its internal periphery, a second downstream annular wall 28 with a substantially L-shaped cross-section, which comprises a substantially radial portion that is connected at its radially internal end to a substantially cylindrical portion extending downstream and comprising, at its downstream end, an annular flange for attachment to the injection means 26.

The radial portion of this second wall 28 of the diffuser extends downstream and along the impeller 30 of the centrifugal compressor 10 so as to define, with same, a radial annular air flow passage 32 communicating at its radially external end with the outlet 20 of the centrifugal compressor.

The combustion chamber 14 has a general frustoconical shape and is inclined inwardly from upstream to downstream. It comprises two coaxial rotating walls 32, 34 extending one inside the other and connected at their upstream ends to a chamber base wall 36, in which said walls 32, 34, 36 mutually define an annular chamber into which the fuel is fed by injectors 38.

The radially external wall 34 of the chamber is attached at its downstream end to an external housing 40, and its radially internal wall 32 is connected at its downstream end to a frustoconical casing 42, which comprises, at its radially internal end, an internal annular flange for attachment to the aforementioned injection means 26.

These injection means 26 include an annular duct 44 with a substantially L-shaped cross-section of which the inlet 46 leads radially outwardly and is located downstream of the flanges of the walls 24, 28 of the diffuser and upstream of the flange of the casing 42 of the chamber, and of which the outlet 48 is directed downstream and is located radially inside the casing 42.

The major portion of the air flow leaving the compressor 10 passes into the diffuser 12 (arrow 52) and supplies the combustion chamber 14 (arrows 54), and internal 56 and external 58 annular channels for bypassing the combustion chamber 14.

The external channel 58 is formed between the external housing 40 and the external wall 34 of the chamber, and the internal channel 56 is formed between the wall 24 of the diffuser and the internal wall 32 of the chamber, and the air the passes into this channel 56 supplies the primary and dilution orifices of the chamber (arrows 60) and the injection means 26 (arrow 62) with air.

The air leaving the injection means 26 is injected into an annular chamber 64 defined downstream by a wheel 66 of the first high-pressure turbine stage 16 and upstream by an annular flange 68 mounted upstream of said wheel. This flange 68 includes orifices 70 aligned axially with the air outlet 48 of the injection means 26 for the air supply to the chamber 64, and is supported at its periphery on the roots of the blades of the wheel 66 so as to ensure their axial support on the disk of said wheel.

The air injected into the chamber 64 flows radially from the inside to the outside, between the downstream face of the flange 68 and the upstream face of the turbine wheel 66, and is intended to supply air to the ventilation cavities of the blades of said wheel.

The flange 68 also has, upstream, radially external annular lips that cooperate with corrodible material blocks surrounded by the outlet of the injection means 26, and attached to said outlet, so as to form a labyrinth-type seal 80.

A small portion of the air flow leaving the centrifugal compressor 10 passes into the radial passage 32 (arrow 50) formed between the impeller 30 of the compressor and the radial part of the wall 28 of the diffuser so as to ventilate the downstream face of the impeller of the compressor and thus cool it. This air then flows from upstream to downstream in an annular space 72 (arrow 73) defined by the second wall 28 of the diffuser and a rotating cylindrical wall 74 extending radially inside said wall 28 and injection means 26, and attached at its upstream and downstream ends, respectively, to the impeller 30 of the compressor and to the flange 68 mounted downstream of the turbine wheel 66.

The air that flows into the chamber 72 is intended to be discharged into the turbine so as to ensure the cooling and/or ventilation of components thereof.

In the prior art shown in FIG. 1, a major portion of the air flow for cooling the impeller of the compressor flowing downstream into the chamber 72 (arrow 73) is intended to pass through substantially radial bypass ducts 76 of the injection means 26 (arrow 77), then to be injected (arrow 78) at the upstream face of the flange 68 in order to ensure its ventilation. The remaining portion of the air flow 73 is intended to pass through the seal 80 (arrow 81) and to mix with the ventilation air leaving the injection means 26. A small portion of the air coming from the injection means 26 and the seal 80 is intended to pass through a second labyrinth-type seal 82 (arrow 84), of which the annular lips are borne by the flange 68, so as to participate with the air 78 in the ventilation of the flange 68. The air having provided ventilation of the flange 68 (arrows 78 and 84) is then injected into the turbine channel (arrow 86).

This technology has the disadvantages described above, in particular because the air flow 86 injected into the turbine does not participate in the thermodynamic cycle of the engine, thereby reducing the performance of the turbine engine.

The invention enables this problem to be overcome by means making it possible to use a large portion of the air flow for cooling the impeller for ventilation and/or cooling of the high-pressure turbine, and in particular the wheel of the first stage of said turbine.

Figure 2:
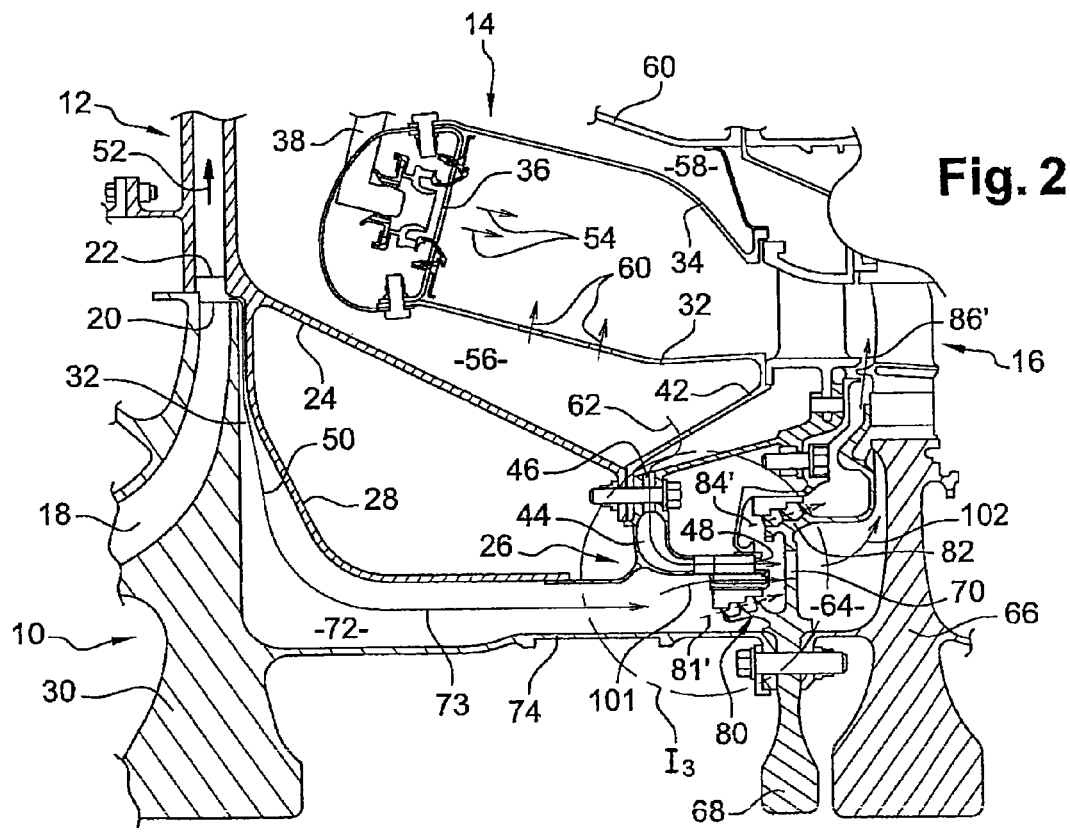
FIG. 2 is a partial diagrammatic half view in an axial cross-section of a turbine engine according to the invention.
Figure 3:
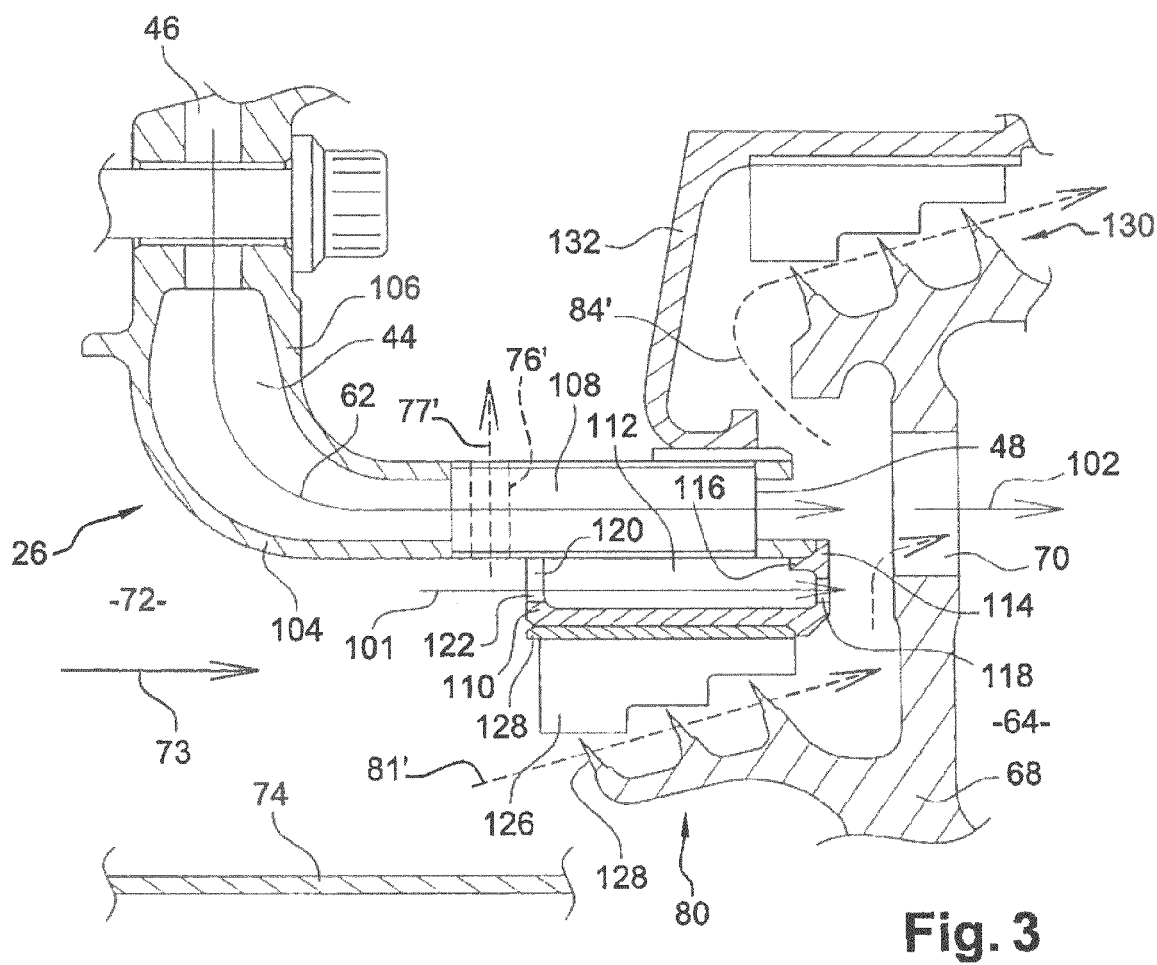
FIG. 3 is a larger-scale view of detail $I_3$ of FIG. 2.

Reference is now made to FIGS. 2 and 3, which show an example of an embodiment of the invention in which the features already described in reference to FIG. 1 are referenced by the same signs.

The example embodiment of FIGS. 2 and 3 differs from that technology of FIG. 1 essentially in that the substantially radial bypass ducts of the injection means are suppressed and are replaced by at least one longitudinal air duct 112, located between the injection means 26 and the labyrinth seal 80, for the passage of air from the chamber 72 to the outlet 48 of the injection means 26 (arrow 101). A large portion of the air flow for cooling the impeller of the compressor 10 (arrow 73) is then mixed with the air leaving the injection means 26 (arrow 62) so as to ventilate the wheel 66 of the first high-pressure turbine stage (arrow 102).

The injection means 26 are in this case of the type including two annular walls, respectively internal 104 and external 106, extending one inside the other and mutually defining a substantially L-shaped duct 44. The injection means 26 also include, at their outlet 48, substantially radial bladings 108 for adjusting the air flow 62 passing through the duct 44.

Figure 5:
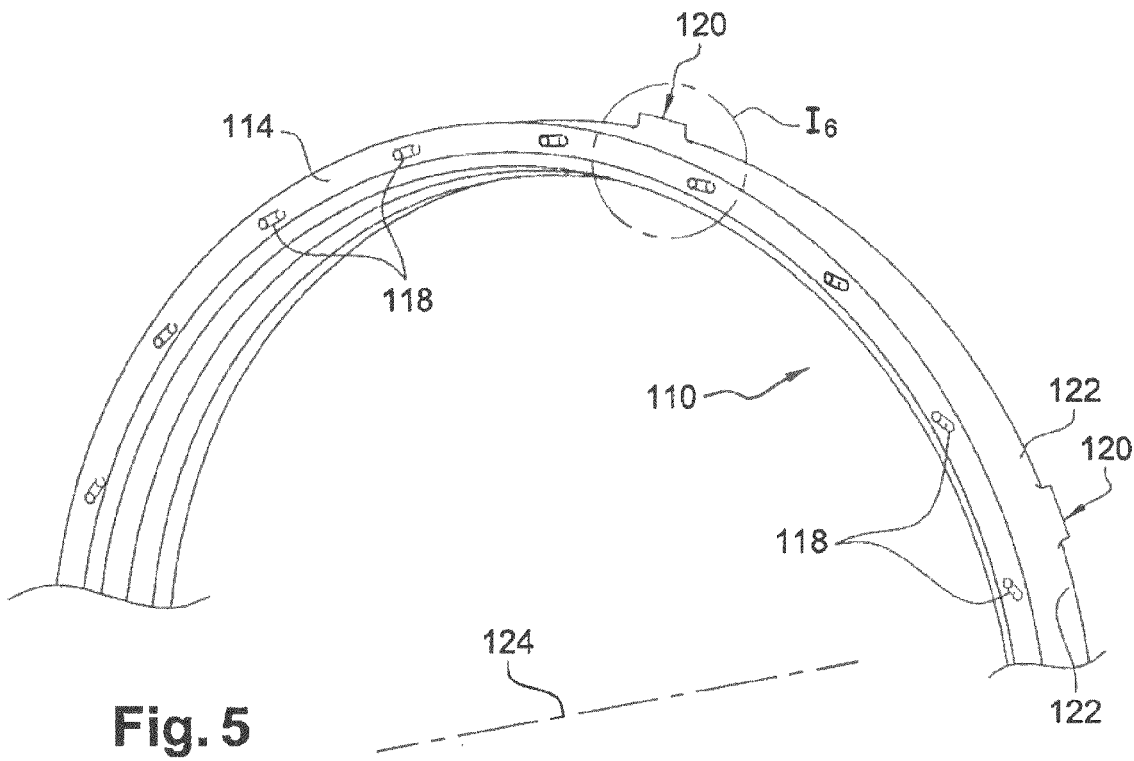
FIG. 5 is a partial diagrammatic view in perspective of the annular sheet according to the invention.
Figure 6:
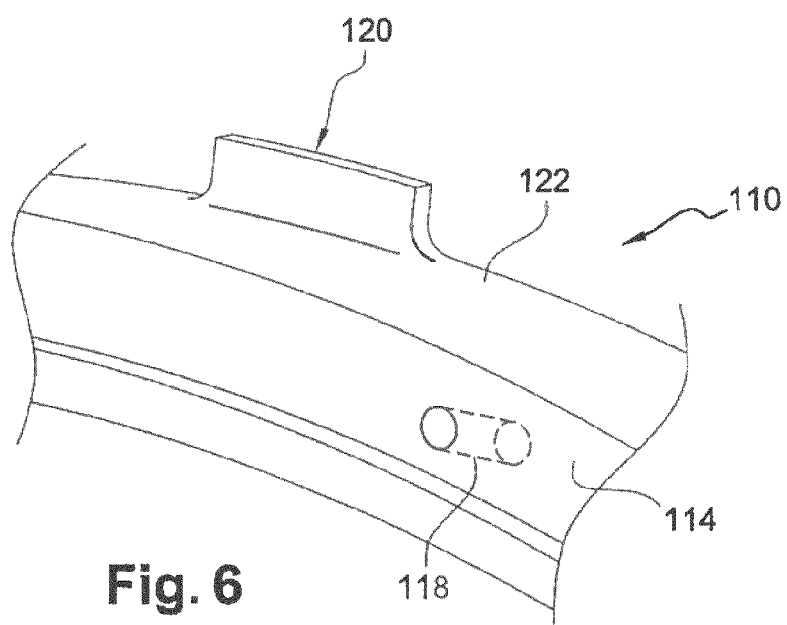
FIG. 6 is a larger-scale view of detail $I_6$ of FIG. 5.

In the example shown, a substantially cylindrical sheet 110, which can be seen more clearly in FIGS. 5 and 6, extends radially inside the internal wall 104 of the injection means, substantially parallel thereto, so as to define with said wall a single annular air passage duct 112 of the chamber 72.

The sheet 110 includes, at its upstream end, a radially external annular edge 120 of which the external periphery is flush with the internal surface of the internal wall 104 of the injection means 26. This upstream edge 120 includes substantially axial air inlet openings 122 in the duct 112.

As can be seen more clearly in FIGS. 5 and 6, the openings 122 have a relatively large angular expanse about the axis 124 of the sheet, enabling it in particular to be made lighter. These openings 122 are regularly distributed about the axis of 124 of the sheet.

The sheet 110 also includes, at its downstream end, a radially external annular edge 114 that is attached by brazing or welding at its external periphery to the downstream end of the internal wall 104 of the injection means 26. The downstream edge 114 of the sheet includes, upstream, a cylindrical rib 116 that is intended to slide in the axial direction radially inside the downstream end of the internal wall 104 of the injection means, so as to ensure the centering of the sheet with respect to the injection means during assembly thereof.

The downstream edge 114 of the sheet also includes substantially axial air outlet orifices 118, which lead upstream into the duct 112 and downstream near the orifices 70 of the flange 68 mounted upstream of the wheel 66 of the first turbine stage.

The air outlet orifices 118 are regularly distributed about the axis 124 and are advantageously inclined from upstream to downstream so as to guide the air leaving the duct 112 in the same direction of rotation as the turbine wheel. This makes it possible to reduce the total relative temperature of the air seen be said wheel, which is given by the following formula: $T_{tr}=T_t+(1-2K)*w^2*R^2/2\,C_p$, in which $T_{tr}$ is the total relative temperature of the air, $T_t$ is the total temperature of the air, $K$ is the entrainment coefficient of the air (which is given by the ratio of the rotation speed of the air to the rotation speed of the wheel), $w$ is the rotation speed of the wheel, $R$ is the radius of the area considered and $C_p$ is the specific heat capacity of the air.

The greater the incline of the outlet orifices 118 in the direction of rotation of the turbine rotor, the closer the coefficient K gets to 1 (it is 0.5 in the case of orifices parallel to the axis of the sheet), and the lower the total relative temperature of the air is. A temperature gain of around 50° is obtained in the case of one particular embodiment of the invention.

The sheet 110 according to the invention has blocks 126 of corrodible material of the labyrinth seal 80. These blocks 126 are attached by brazing or welding to an annular support plate 128, which is itself attached by brazing or welding to the internal cylindrical surface of the sheet 110. These blocks 124 cooperate by friction with the annular lips 129 borne by the upstream disk 68 of the turbine 16.

A small portion of the air flow 73 is intended to axially pass through the seal 80 (arrow 81') and to be mixed with the air flow 101, 62 coming from the duct 112 and the injection means 26. The major portion of this air mixture is injected into the chamber 64 for ventilation of the turbine 16 (arrow 102). The remaining portion of this air mixture passes through the seal 130 located radially outside the orifices 70 of the flange 68, between said flange and an upstream annular wall 132 (arrow 84') and is intended to ventilate the radially external part of the flange 68, then to be injected into the channel of the turbine (arrow 86'). The flange 68 is therefore always ventilated, but with a minimal air flow so as not to adversely affect the performance of the turbine engine, as explained above.

Figure 4:
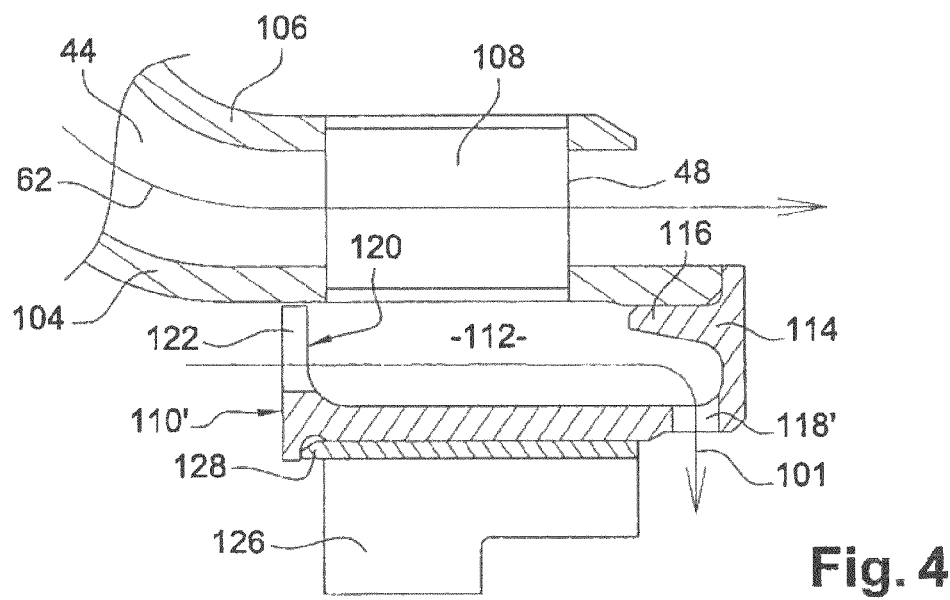
FIG. 4 is a view corresponding to that of FIG. 2 and shows an alternative embodiment of the invention.

FIG. 4 shows an alternative embodiment of the sheet 110' according to the invention, in which this sheet differs from that of FIGS. 3, 5 and 6 in that the air outlet orifices 118' are directed substantially radially and lead, at their radially external ends, into the duct 112 and, at their radially internal ends, downstream of the blocks 126 of corrodible material borne by said sheet.

These orifices 118' are advantageously inclined with respect to the radial axes in the direction of rotation of the turbine rotor, as explained above.

In another alternative embodiment shown by the interrupted lines of FIG. 3, the injection means 26 also include substantially radial bypass ducts 76' for the passage of air from the chamber 72 radially outside the injection means (arrow 77'), in which this air is intended to then participate in the ventilation of the flange 68, as in the prior art. The majority of the air flow 73 for cooling the impeller of the compressor is nevertheless intended to pass through the duct 112 (and seal 80) so as to mix with the air leaving the injection means 26 and thus participate in the ventilation of the turbine.

The invention claimed is:

1. A turbine engine, comprising
   a final centrifugal compressor stage associated with an annular diffuser for supplying air to an annular combustion chamber;
   a high-pressure turbine wheel;
   an upstream flange mounted upstream from said high-pressure turbine wheel;
   injection means configured for injecting air onto the high-pressure turbine wheel through orifices of said upstream flange, said injection means being supplied with the air by the annular diffuser, and said final centrifugal compressor stage comprising an impeller which is connected by a rotating wall to the upstream flange;
   a labyrinth seal mounted between the injection means and the upstream flange; and
   at least one longitudinal duct disposed between the labyrinth seal and the injection means, such that the at least one longitudinal duct is located radially outside the labyrinth seal and located radially inside the injection means,
   wherein said at least one longitudinal duct is fed with air taken up from the final centrifugal compressor stage and has downstream air outlet orifices for injecting air onto the high-pressure turbine wheel through said orifices of said upstream flange.

2. The turbine engine according to claim 1, wherein an annular sheet is mounted radially inside the injection means, and defines said at least one longitudinal duct with said injection means.

3. The turbine engine according to claim 2, wherein
   an upstream end of the annular sheet comprises a radially external annular edge, an external periphery of said radially external edge being supported on the injection means or being at a radial distance from the injection means, and
   said radially external edge comprises axial air inlet openings.

4. The turbine engine according to claim 2, wherein a downstream end of the annular sheet includes an annular edge formed with the downstream air outlet orifices.

5. The turbine engine according to claim 4, wherein the downstream air outlet orifices are substantially axial or inclined from upstream to downstream so as to guide the air leaving in a direction of rotation of the turbine wheel.

6. The turbine engine according to claim 4, wherein the downstream air outlet orifices lead radially inwardly, and are substantially radial or inclined from an outside to an inside with respect to a radial axis in order to guide the air leaving in the direction of rotation of the high-pressure turbine wheel.

7. The turbine engine according to claim 2, wherein a downstream end of the annular sheet is attached by brazing or welding to a downstream end of the injection means.

8. The turbine engine according to claim 2, wherein an internal cylindrical surface of the annular sheet is attached to a corrodible material block.

9. The turbine engine according to claim 1, wherein the injection means includes substantially radial bypass ducts.

* * * * *